No. 12,058. Reissued Nov. 25, 1902.

J. A. TURNER.

TENSION FOR BRAIDING CARRIERS.

(Application filed Nov. 1, 1901.)

Witnesses:

E. S. Bhadwick.

Arthur G. Rendall

Inventor:

Julius A. Turner, by Olive R. Mitchell,

Attorney.

UNITED STATES PATENT OFFICE.

JULIUS A. TURNER, OF SOUTHFIELD, MASSACHUSETTS, ASSIGNOR TO THE UNITED STATES WHIP COMPANY, OF WESTFIELD, MASSACHUSETTS.

TENSION FOR BRAIDING-CARRIERS.

SPECIFICATION forming part of Reissued Letters Patent No. 12,058, dated November 25, 1902.

Original No. 679,650, dated July 30, 1901. Application for reissue filed November 1, 1901. Serial No. 80,827.

*To all whom it may concern:*

Be it known that I, JULIUS A. TURNER, a citizen of the United States, and a resident of Southfield, in the county of Berkshire and State of Massachusetts, have invented a new and Improved Tension for Braiding-Carriers, of which the following is a full, clear, and exact description.

The purpose of the invention is to provide a simple tension for racers for whip-lash-braiding machines comprising a fixed tension-block, a pivoted pressure-block, and a convenient means for moving the pressure-block and regulating its pressure against the thread or strand.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
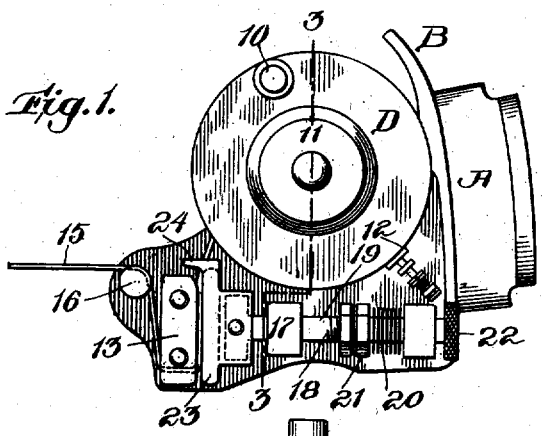
Figure 2:
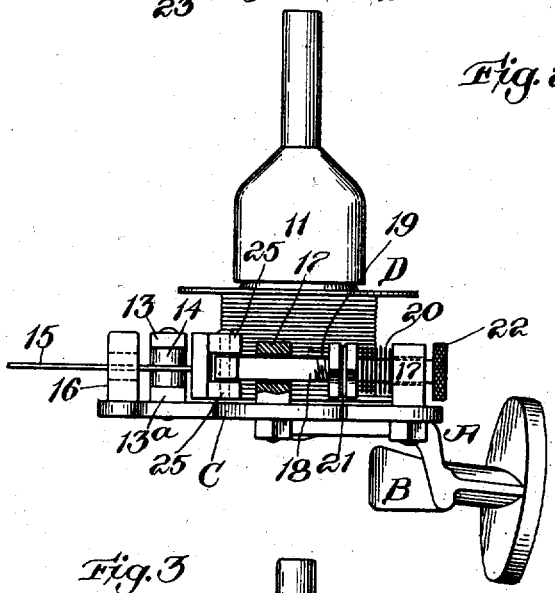
Figure 3:
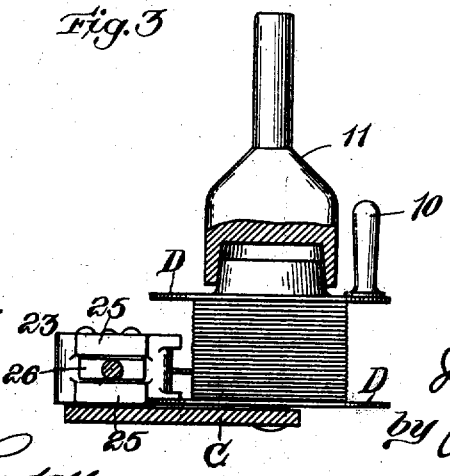

Figure 1 is a plan view of the improved device. Fig. 2 is a side elevation, parts being in section; and Fig. 3 is a section taken practically on the line 3 3 of Fig. 1.

A represents the racer, and B the tail, belonging to the braiding-machine, particularly machines for braiding whip-lashes.

C represents the bed-plate, which is at an angle to the racer, and D a reel mounted to turn on said bed-plate. This reel is shown as provided with a handle 10 and with a cap 11. In connection with the reel a brake 12 is shown, which is spring-controlled and is located on the base C and has sufficient bearing against the head of the reel adjacent to the base to prevent the reel from turning too fast.

The cap 11 in practice is suspended by a flexible shaft driven in any suitable manner and is intended to impart motion to the reel when it is to be replenished with material as the reel is filled while in position on the device. When the reel is to be turned by the cap 11, the cap is forced down to a frictional engagement with the cone of the reel, (shown best in Fig. 3,) the cap being broken away to show the cone.

With reference to the tension device, a thread-guide is located on the bed-plate C near one end or the end opposite that at which the racer is located. This thread-guide is usually constructed as illustrated in Fig. 2, in which upper and lower plates 13 and 13[a] are connected near their ends by posts 14, which posts serve also to secure the plates of the thread-guide to the base C. The thread or strand 15 from the reel passes in engagement with the inner face of both of the posts 14 and around one of the posts and over a tension-pin 16, likewise located on the base. This pin 16 forms a second guide for the strand 15 and is so located as to cause the strand between the reel and the work to make an abrupt change in its direction at said pin itself and also at the lower or inner end of the first tension. The frictional resistance to the movement of the strand produced by this arrangement results in putting a normal drag on the strand, and means are provided for adding to this normal drag as may be desired and to any extent within practical limits by pressing the strand against the face of the first tension-block in advance of an angular change of direction of the first strand about this first tension-block. Adjacent to the thread-guide apertured lugs 17 are removably attached to or formed upon the base C, and a stem or rod 18 is mounted to slide freely in the apertures of these lugs, being provided at a point between the lugs with a threaded section 19. A spring 20 is coiled around the rod or stem 18, having bearing against one of the lugs 17 and against a nut 21 on the threaded portion of the rod or stem 18, and by adjusting the nut 21 the spring 20 may be placed under more or less tension.

At the end of the rod or stem 18 adjacent to the racer A a knob 22 is formed, and at the opposite or inner end of the rod or stem 18 a pressure-block 23 is pivotally attached. This pressure-block faces the thread-guide or tension-block, and the thread is adapted to pass between the pressure-block and the said tension-block. The pressure-block is provided at the end nearest the reel with a bifurcated foot 24, which serves to direct the thread or strand 15 without friction to the space between the clamping-face of the pressure-block and corresponding face of the thread-guide.

The pressure-block is usually mounted on the rod or stem in the following manner: Upper and lower lugs 25 are formed at the central portion of the edge of the pressure-block which faces the rod or stem, and a head 26 is formed upon the rod or stem 18, which head enters the space between the lugs 25, as shown in Fig. 2. The pivot-pin of the pressure-block is passed through these lugs at their center and through the central portion of the head 26. Thus it will be observed that the pressure-block is capable of a rocking movement and may accommodate itself to irregularities in the thread and that it will have at all times a perfect bearing against the length of the thread with which it comes in contact.

The thread may be placed in the space between the tension-block and pressure-block by drawing out the rod or stem 18 through the medium of the knob 22, and by adjusting the nut 21 the spring will cause the pressure-block to bear with greater or less force against the thread, so that the tension on the thread may be minutely regulated.

The tension stem or rod 18 may be placed in position in the guide-lug 17 when the lugs are removed from the device, the knob 22 having been removed from the stem or rod. At this time the end of the tension stem or rod from which the knob was removed is passed through one guide-lug. The adjusting-nut 21 and spring 20 are then placed in position on the said stem or rod and the stem or rod is passed through the second guide 17. The knob 22 is now secured to the tension-bar and the lugs 17 are fixed in position on the bed-plate C.

Having thus described my invention, I claim as new and desire to secure by Letters Patent—

1. In a braiding-carrier, the combination of a base; a reel mounted thereon; a tension-block fast to the base; a pressure-block; means to force the pressure-block forward to cause the strand to be pressed against the tension-block and another tension-block fast to the base and positioned to cause the strand to make an abrupt change of direction between the first-mentioned tension-block and the work.

2. In a braiding-carrier, the combination of a base; a reel mounted thereon; a tension-block fast to the base; a pressure-block; adjustable means to press the pressure-block forward to cause the strand to be pressed against the tension-block; another tension-block fast to the base and organized and arranged to cause the strand to make an abrupt change of direction between the first-mentioned tension-block and the work.

3. In a braiding-carrier; the combination of a base; a reel mounted thereon; a tension-block fast to the base; a pressure-block; means to press the pressure-block forward to cause the strand to be pressed against the tension-block, the parts being organized and arranged to cause the strand to make an abrupt change of direction around the tension-block as it passes to the work.

4. In a braiding-carrier, the combination of a base; a reel mounted thereon; a tension-block fast to the base; a pressure-block; means to press the pressure-block forward to cause the strand to be pressed against the tension-block; there being means to cause the strand to make an abrupt change of direction around the tension-block as it passes to the work.

In testimony whereof I have signed my name to this specification in the presence of two subscribing witnesses.

JULIUS A. TURNER.

Witnesses:
HENRY W. ELY,
CORNELIUS F. DONOVAN.